United States Patent [19]

Lee

[11] Patent Number: 5,109,463
[45] Date of Patent: Apr. 28, 1992

[54] FIBER OPTIC LAMP

[76] Inventor: Ho-Shang Lee, 3705 Painted Pony Rd., El Sorbrante, Calif. 94803

[21] Appl. No.: 543,339

[22] Filed: Jun. 25, 1990

[51] Int. Cl.$^5$ .................................................. G02B 6/16
[52] U.S. Cl. ..................................... 385/123; 385/142
[58] Field of Search ............... 350/96.3, 96.34, 96.29; 385/123, 141, 142, 143

[56] References Cited

U.S. PATENT DOCUMENTS

| | | | |
|---|---|---|---|
| 3,935,119 | 1/1976 | Barber et al. | 350/96.1 X |
| 4,023,066 | 5/1977 | Smulders | 315/246 |
| 4,733,929 | 3/1988 | Brown | 350/96.34 X |
| 4,812,013 | 3/1989 | Aurduet et al. | 350/96.1 X |
| 4,884,860 | 12/1989 | Brown | 350/96.29 X |
| 4,923,279 | 5/1990 | Ainslie | 350/96.34 X |
| 4,955,685 | 9/1990 | Garman | 350/96.3 |

Primary Examiner—John D. Lee
Assistant Examiner—Stephen W. Barns
Attorney, Agent, or Firm—Majestic, Parsons, Siebert & Hsue

[57] ABSTRACT

A fiberoptic lamp includes one or more optical fibers which include an emitting material so that optical energy given off by the emitting material will be transmitted by the fibers. The lamp has a housing which holds the fibers and an exciting device where energy given off by the exciting device causes the emitting material of the fibers to emit optical energy. This eliminates the need to channel the energy of the exciting device or the optical power emitted by the emitting material into apertures or ends of optical fibers and improves the efficiency of the lamp.

27 Claims, 7 Drawing Sheets

FIBER OPTIC LAMP

BACKGROUND OF THE INVENTION

1. Field of the Invention

The present invention relates to a device for generating optical energy within an optical fiber. Specifically, the invention uses a material within the fiber as the source of optical energy. Because the light source is within the fiber, the invention has advantages over prior art where the light is generated from outside of the fiber and must be guided into the fiber.

2. Description of the Background Art

Optical fibers are widely used in communication, sensing, illumination, imaging, inspection and medical applications. These applications use a fiber optic strand to transmit light from a light emitting source at one end of the fiber to a destination at the other end of the fiber. In conventional fiber optic devices the light source has been outside of the fiber. This requires lenses, reflectors or a combination of these or other means to channel the light into the relatively small aperture or "end" of the fiber.

These methods suffer from poor coupling efficiency because the optical emission from the light source has a wide angle of dispersion and the fiber aperture is a narrow angle. An incandescent source has typically been used which has a filament, or light emitting body, which is physically much larger than the fiber aperture. As a result, the focusing by the optical elements down to an area comparable to the fiber core is inefficient.

In U.S. Pat. Nos. 4,573,761; 4,730,895 and 4,860,172 light is generated at a location external to the fiber via conventional means and is introduced into the fiber end. U.S. Pat. No. 4,573,761 discloses a fiber optic probe made up of a bundle of fibers. One of the fibers in the bundle is used to transmit laser light to a target to be probed. A portion of the light reflected from the target enters the ends of the other fibers in the bundle and is detected. U.S. Pat. No. 4,730,895 uses an incandescent source and lens to introduce light into the end of a bundle of optical fibers U.S. Pat. No. 4,860,172 uses a reflector and lens to focus light into the fiber end.

U.S. Pat. Nos. 3,578,972 and 3,578,973 use a phosphorescent material as the light source. However, the material is external to the fiber and the emitted light is still introduced into the fiber end. U.S. Pat. No. 4,661,711 uses a fluorescent material within the fiber but only as a reference standard. The fluorescent material is excited by light entering the fiber through the fiber end. The excited fluorescent material then produces a constant reference light at the other end of the fiber which is independent of the source light.

The article "Electric-Discharge Sensor Utilizing Fluorescent Optical Fiber," published in July of 1989, uses a fluorescent material inside the fiber but only as a sensor of an electric discharge. Thus, while the article describes an invention which uses a luminescent optical fiber to receive energy outside of the aperture of the fiber's end, it is being used only as a detector to sense an unfixed, random radiation event.

SUMMARY OF THE INVENTION

It is a principal object of the invention to provide an efficient means of producing optical energy within an optical fiber. This goal is realized by placing the light source within the fiber, or sufficiently close to the fiber, so that substantially all of the light from the source is propagated within the fiber without the need of reflectors or lenses.

One way of achieving this is to use a luminescent material embedded in the fiber. As used in this specification, "luminescence" refers to light emission that cannot be attributed merely to the temperature of the illuminating body. A material will luminesce, or give off energy, when excited by other energy. This exciting energy can be in the form of photons, cathode rays, electric fields, chemical reactions, biochemical reactions and mechanical disruption.

Luminescence may be radiation in any region of the electromagnetic spectrum. Also, a luminescent substance may be a gas, liquid or solid. Although fluorescence and phosphorescence are sometimes used synonymously with luminescence, as used in this specification luminescence encompasses both fluorescence and phosphorescence. The latter terms are defined as further categorizing a luminescent material by referring to the persistence of emission from the material after the source of exciting energy is removed.

The invention comprises one or more optical fibers of a type suitable for transmitting optical energy. The optical fibers include an emitting material within or sufficiently close to the fibers so that optical energy given off by the emitting material will be transmitted by the fibers. The invention includes a means for exciting the emitting material into emission of optical power.

The use of the combination of the exciting means and the emitting material allows the energy given off by the exciting means to cause the emitting material to generate optical power which is transmitted by the fibers without the need to channel the energy of the exciting means into the fibers' apertures or ends. The invention also includes a holding means to hold the optical fibers and exciting means so that the effect of the exciting means is to excite the emitting material into emission of optical power.

DESCRIPTION OF THE PREFERRED EMBODIMENT

Figure 1:
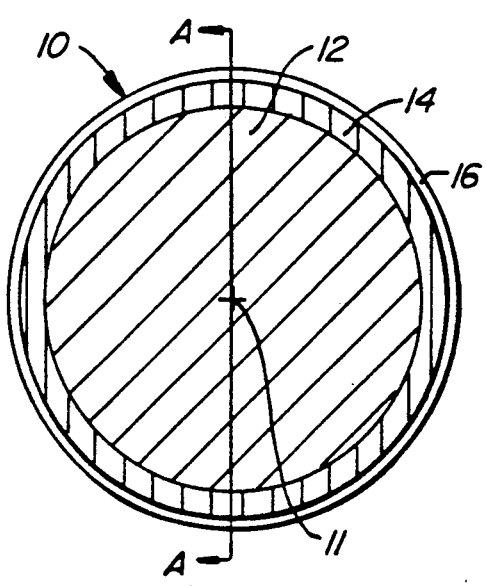
FIG. 1 is a cross-sectional view of an optical fiber taken transverse to the longitudinal axis of the fiber.

The invention includes several designs that improve the efficiency with which optical power can be produced within a fiber. The disclosed embodiments use photons as the source of exciting energy and the photons are radiated by an electric discharge tube. The luminescent fiber can be outside of or inside the discharge tube. If the fiber is inside the discharge tube, the tube can be coated with a material which reflects radiation given off by the gas within the electric discharge tube so that any radiation not directly impinging the fiber will be reflected back towards the fiber.

If the fiber is outside of the discharge tube, the tube and the fiber can be held in a housing. The housing can have a reflective coating on its inner or outer surface in order to reflect any radiation not directly impinging the fiber. The housing can be of varying designs to hold the discharge tube and fiber in orientations which will maximize the amount of radiation impinging the fiber. For example, the housing can be cylindrical, where the cross section of the housing is an ellipse. Then the discharge tube can be cylindrical and located at one of the foci of the ellipse defined by the housing's cross section taken transverse to the housing axis. The fiber would be at the other focus thus providing for maximum irradiation of the fiber.

The fiber can be a single fiber or a bundle of fibers. The physical shapes of the discharge tube, fiber and housing may be optimized in order to improve the efficiency of the invention. That is, it is possible that by forming the part of the optical fiber containing the luminescent material into a shape other than a strand, or by forming the electrical discharge container into a shape other than a tube or by using a housing of a shape other than a cylinder the efficiency of the present invention may be optimized. This disclosure should be understood as encompassing any shape, geometry or configuration of the exciting means, fiber or housing.

Where the exciting means is other than by radiation, improved efficiency, economy of manufacture, or compactness of design may be achieved. For example, by using an electroluminescent material instead of a photoluminescent material, it is possible to excite the luminescent material directly with an electrical charge without the need for a discharge tube.

The housing may be provided with various ways to dissipate the heat which may be generated by the exciting means. This can be accomplished by merely providing for a design in which the various components of the invention are in sufficient contact with heatconducting material so that heat retention is minimized. Therefore, if the invention is assembled with adhesives or bonding agents these should be sufficiently heatconductive. The housing itself could be heat conductive and can be provided with heat dissipating "fins" so that heat is more readily transferred to the surrounding environment. Additionally, the housing can be designed so that cooling is accomplished by means of circulating a liquid or gas coolant throughout the housing.

The present invention uses a luminescent fiber to efficiently generate optical power within the fiber. The amount of luminescent fiber accessible to the radiation source is maximized by placing the fiber or fibers in specific orientations to the radiation source. Also, the radiation source is fixed and is designed to maximize the radiation that will impinge the fiber directly or indirectly.

FIG. 1 is a cross-sectional view of an optical fiber 10 taken transverse to axis 11. Central core 12 is surrounded by cladding 14. Either the core or cladding or both may be embedded with luminescent material. This can be achieved by doping the core or cladding with one or more of several kinds of luminescent material such as phosphor, tungstate, zinc silicate or rare earth oxide. The substrate material of the core or cladding can be glass, quartz or plastic. Furthermore, fibers such as 10 can be made wholly of luminescent material while still retaining desirable optical transmission properties. Also, the luminescent material may be coated onto the outside of the cladding 14 as shown by coating 16. The luminescent material need not be present along the entire length of the fiber strand. In the preferred embodiment, only the portion of the fiber inside a housing (described below) contains the luminescent material.

Figure 2:
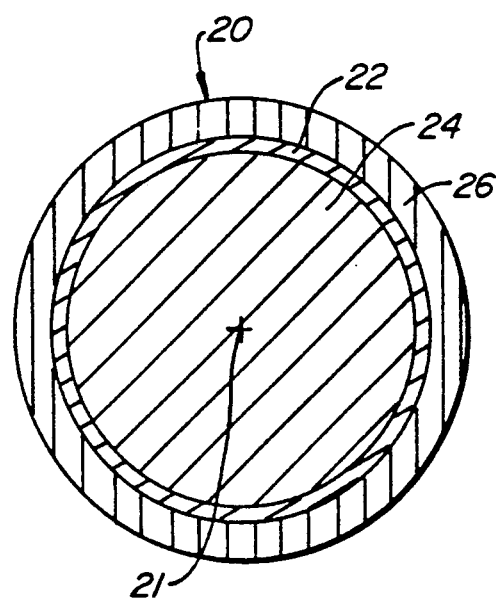
FIG. 2 is a cross-sectional view of an optical fiber with an interface layer between the core and cladding taken transverse to the longitudinal axis of the fiber.

FIG. 2 is a cross-sectional view of an optical fiber 20 taken transverse to axis 21, with an interface layer 22 between the core 24 and cladding 26. Interface layer 22 contains luminescent material. Core 24 and cladding 26 can also contain luminescent material as in the optical fiber 10 of FIG. 1. Any combination of applying luminescent material to the inside or outside of the fiber as shown in FIGS. 1 and 2 is within the scope of the invention. Additionally, other applications of such material either within, upon or contacting the optical fiber are within the scope of the invention.

Figure 3:
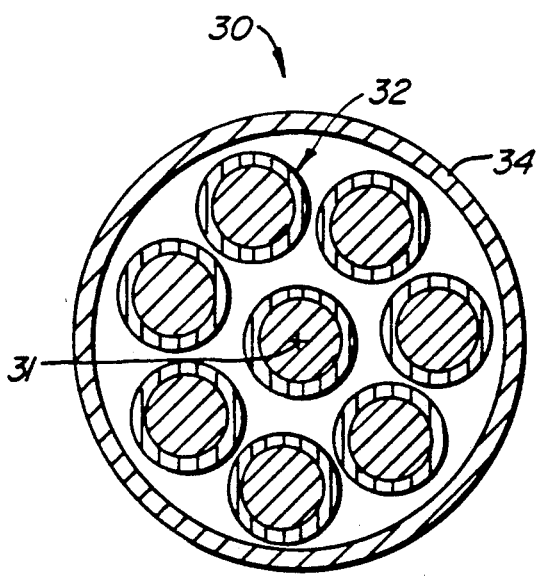
FIG. 3 is a cross-sectional view of a bundle of optical fibers taken transverse to the longitudinal axis of the bundle.

FIG. 3 is a cross-sectional view of a bundle of optical fibers 30 taken transverse to axis 31. The bundle is made up of 2 or more single optical fibers 32, of the type shown as fiber 10 in FIG. 1 or fiber 20 in FIG. 2, surrounded by a protective casing 34.

Figure 4:
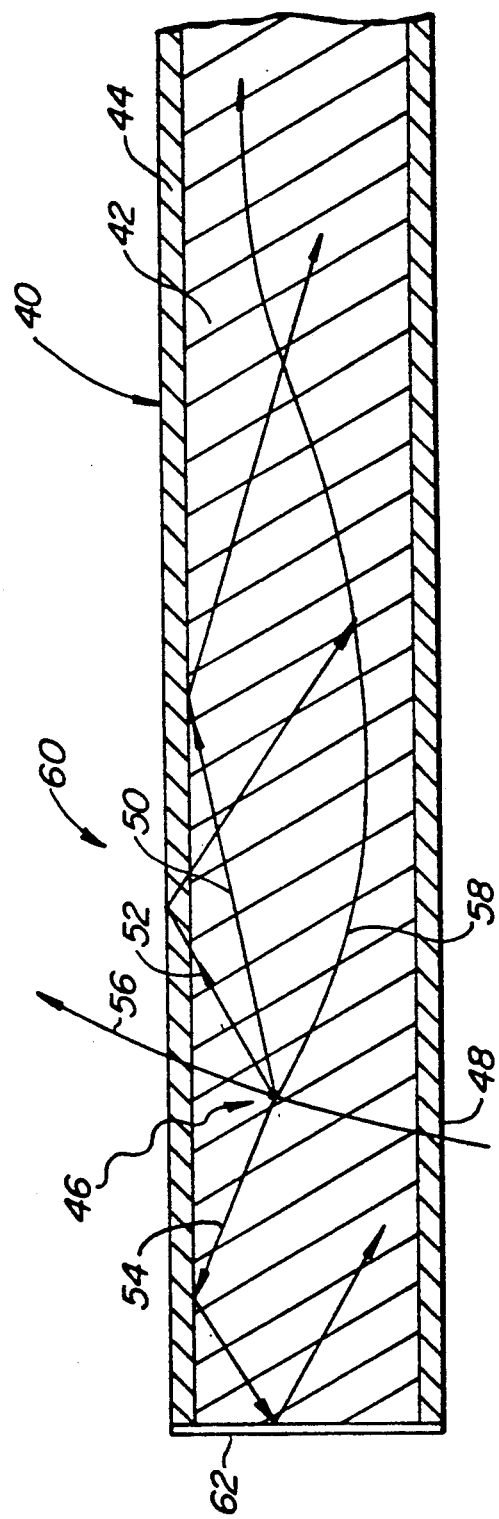
FIG. 4 is a cross-sectional view of a fiber taken along the line A—A in FIG. 1, showing a sample point where a luminescent particle is excited and emission takes place.

FIG. 4 is a cross-sectional view of optical fiber taken along a plane containing the longitudinal axis of the fiber. The fiber 40 comprises core 42 and cladding 44. Cladding 44 contains luminescent material within the core. Luminescent particle 48 is shown absorbing a photon 46 given off by the exciting means which, in this case, is a means which radiates optical energy. Emission over a range of wavelengths occurs following absorption. Rays 50, 52, 54, 56 and 58 are shown being given off by luminescent particle 48's reemission of photons.

Ray 50 is reflected at the interface of the core 42 and cladding 44 and will be confined to the fiber and propagate along it.

Some rays will be reflected by total internal reflection and will propagate along the fiber for long distances. Other rays will escape depending on the angle of incidence at the interface between the cladding 44 and the outside medium 60. Ray 52 is reflected at the interface of the cladding 44 and surrounding medium 60. Optical energy made up of rays such as 52 will be partially reflected so that its propagation distance will be limited. Ray 54 remains confined within the core 42 but progresses towards the stub end of the fiber and is reflected by the end reflective coating 62. Ray 56 is emitted at a small angle to the radial direction of the fiber and is leaked out of the fiber.

Ray 58 shows that if the core is of the graded index type then the ray will follow a curved path and be propagated along the fiber. With a graded index type of core the effects will be essentially the same for reflected and lost rays as shown above for rays 52, 54 and 56.

Because the wavelength of the optical energy given off by the exciting means will be different from the wavelength of the optical energy given off by the emitting material, it is possible to coat the entire exterior of the fiber with a substance which will reflect the emitting material's optical energy and be transparent to the optical energy radiated by the exciting means. This will eliminate leakage of emitted rays such as ray 56.

Figures 5, 6:
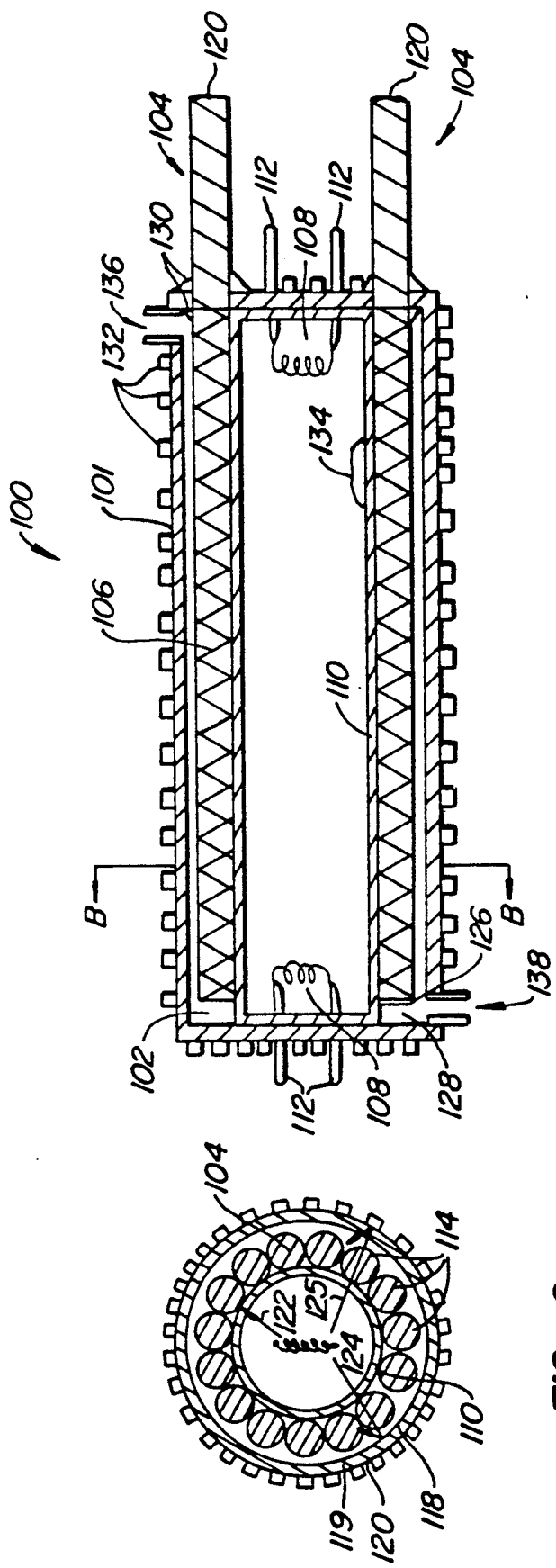
FIG. 5 is a cross-sectional view of a first version of the fiber optic lamp taken along a plane in which the longitudinal axis of the lamp lies.
FIG. 6 is a cross-sectional view of a first version of the fiber optic lamp taken along the line B—B in FIG. 5.

FIGS. 5 and 6 are longitudinal and crosssectional views, respectively, of a first version of the preferred embodiment of the invention. In FIG. 5, housing 101 defines a cavity 102 which contains optical fibers 104 protruding from housing 101. The optical fibers 104 have a doped portion 106 containing the luminescent material. The doped portion 106 is preferably that portion of the fiber inside cavity 102. Electrodes 108 are located, one at each end of housing 101. The electrodes 108 are within a discharge tube 110 which is filled with a gas such as halogen, rare gases or deuterium, or a vapor such as mercury, sodium or metal halide.

When electrical energy is applied to the terminals 112 of electrodes 108 an electrical arc is generated by means of the local ionization of the gas in the discharge tube 110. Within the gases or vapors in contact with the electrodes 108, a fraction of the atoms are ionized and free electrons are released to excite other atoms. As the excited atoms return to lower states or the ground state, photons are emitted within a range of wavelengths. Discharge tube 110 is transparent to the emitted wavelengths.

A metal 134 can exist within the discharge tube in solid or liquid form. When electrical energy is applied to terminals 112 of electrodes 108 the local ionization of the gas, as above, generates heat which causes the metal to vaporize and enter a gaseous state. The metal vapor acts to increase the conductivity between the electrodes in the discharge tube and improves the efficiency of the radiation process. The metal vapor may also be the primary agent for the radiation process. That is, the atoms of the metal vapor will be ionized to release free electrons to excite other atoms and the number of the electrons released by the metal vapor may be substantially greater than the number of electrons released by the ionized gas.

Figure 7:
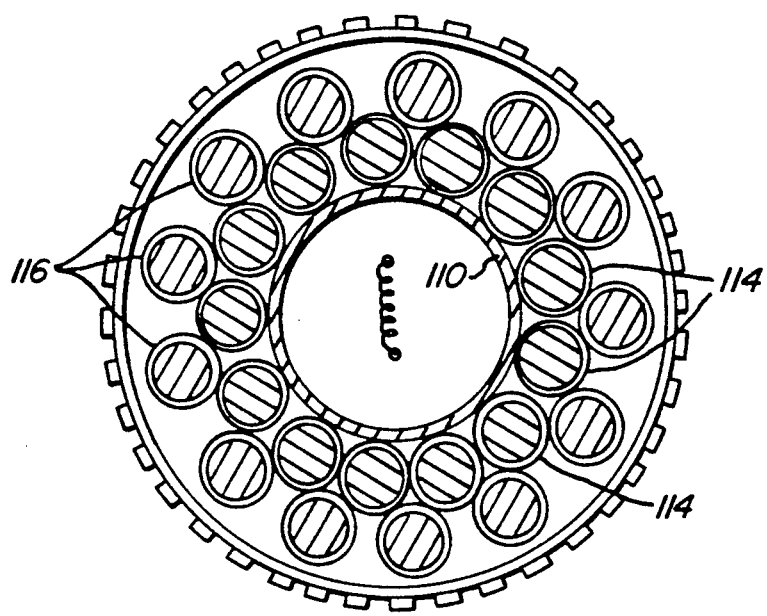
FIG. 7 is a cross-sectional view of a first version of the fiber optic lamp with more than one layer of optical fibers around the discharge tube taken along the line B—B in FIG. 5.

In FIG. 6, a sheath of parallel fibers made up of fibers such as fibers 104 is either bonded to the exterior surface of discharge tube 110 or mechanically restrained onto the exterior surface to form a fiber ring 114. Fiber ring 114 can be made up of a single layer of fibers around discharge tube 110 as shown in FIG. 6, or additional layers, 116 can be placed around the layer 114 as shown in FIG. 7. FIGS. 6 and 7 are cross-sectional views of device 100 taken transverse to the longitudinal axis of device 100.

FIG. 6 shows that housing 101 contains both fiber ring 114 and discharge tube 110. A reflective coating can be applied to the inner wall 118 or the outer wall 120 of housing 101. If the coating is applied to outer wall 120 then housing wall 119 must be transparent to ray 125. As shown by ray 122 in FIG. 6, some optical rays produced by the electric discharge directly impinge the luminescent material contained in the fiber. The excited luminescent material reemits in a range of wavelengths normally longer than those of the excitation spectrum generated by the discharge. The reflective coating on the interior surface 118 of the housing 101 is used to reflect unabsorbed optical rays such as 124 back to fiber ring 114.

Ray 125 illustrates the embodiment where the housing wall 119 is transparent and a reflective coating is applied to the outer wall 120. Ray 125 is not directly absorbed by luminescent material within the fiber ring 114 and is reflected off of the outer wall 120.

In FIG. 5, a reflective coating 126 is also applied to the ends 128 of fibers 104 which are within housing 101 to direct light propagation within fibers 104 towards the other end 128.

A temperature resistant cement 130 is applied to seal the connection between the housing and fibers 104 where the fibers exit from housing 101. The provisions made for cooling cavity 102 include conduction of heat by the fibers to heat-dissipating elements or fins 132 on the outside of housing 101. Also, the heat dissipating means can include a circulating liquid or gas within the cavity. If forced circulation of the liquid or gas is desired, inlet 136 and outlet 138 can be provided through the wall of housing 101.

Figure 8:
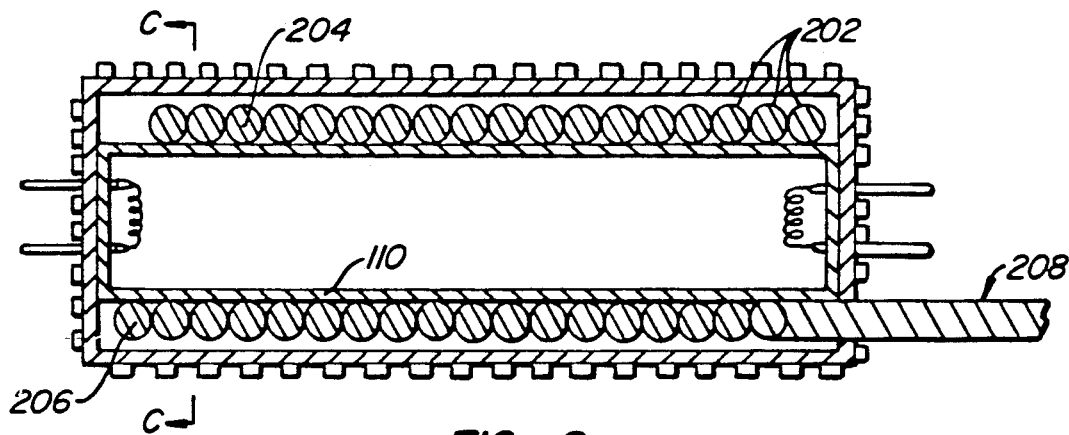
FIG. 8 is a cross-sectional view of a first version of the fiber optic lamp with the fiber wound around the discharge tube, taken along a plane in which the longitudinal axis of the lamp lies.
Figure 9:
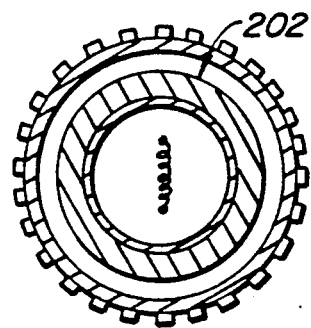
FIG. 9 is a cross-sectional view of a first version of the fiber optic lamp with the fiber wound around the discharge tube taken along the line C—C in FIG. 8.

Fiber sheath 114 shown in FIG. 6 can be replaced by a fiber coil 202 as shown in FIGS. 8 and 9. In FIG. 8 the fiber coil is a single fiber 204 wrapped around discharge tube 110. A reflective coating is applied to the starting end 206 of fiber coil 202 to direct propagation within fiber 204 to the other end 208. By winding fiber 204 around the discharge tube 110, the volume of the luminescent material within the fiber which is exposed to direct radiation from discharge tube 110 is maximized. On the other hand, a fraction of the optical power being transmitted by the fiber may leak in the course of transmission through the fiber coil due to bending the fiber around the discharge tube.

Figure 10:
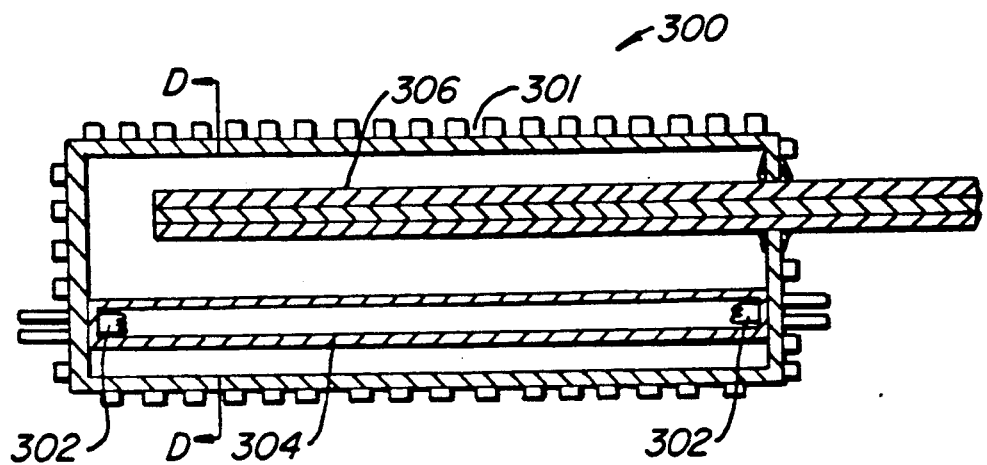
FIG. 10 is a cross-sectional view of a second version of the fiber optic lamp taken along a plane in which the longitudinal axis of the lamp lies.
Figure 11:
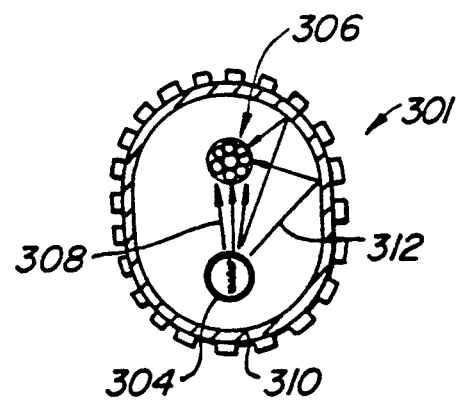
FIG. 11 is a cross-sectional view of a second version of the fiber optic lamp taken along line D—D in FIG. 10.

FIGS. 10 and 11 are longitudinal and crosssectional views, respectively, of a second version 300 of the fiber optic lamp. Fibers such as 104 described in FIG. 5 are now used to form a fiber bundle 306 which is similar to the fiber bundle 30 as shown in FIG. 3. However, the protective casing 34 of the fiber bundle in FIG. 3 is transparent to the radiation given off by the discharge tube 304 in FIG. 10. In FIG. 10, a pair of electrodes 302 are located at the two ends of discharge tube 304. Discharge tube 304 performs the same function as discharge tube 110 in FIG. 6.

Inner wall 310 of housing 301 is coated with reflective material. This reflective coating is used to reflect rays from discharge tube 304 which are not directly absorbed by fiber bundle 306. Some rays 308 radiate from discharge tube 304 and are directly absorbed by fiber bundle 306. Other rays 312 are not directly absorbed by fiber bundle 306 but are reflected off of the reflective coating on the inner wall 310 of housing 301.

Housing 301 is cylindrical with an elliptical cross section as shown in FIG. 11. Discharge tube 304 is located at one of the foci of the elliptical cross section and fiber bundle 306 is at the other focus. This geometry provides for reflected rays 312 to readily contact the fiber bundle 306 and be absorbed by luminescent material within the fibers.

Figure 12:
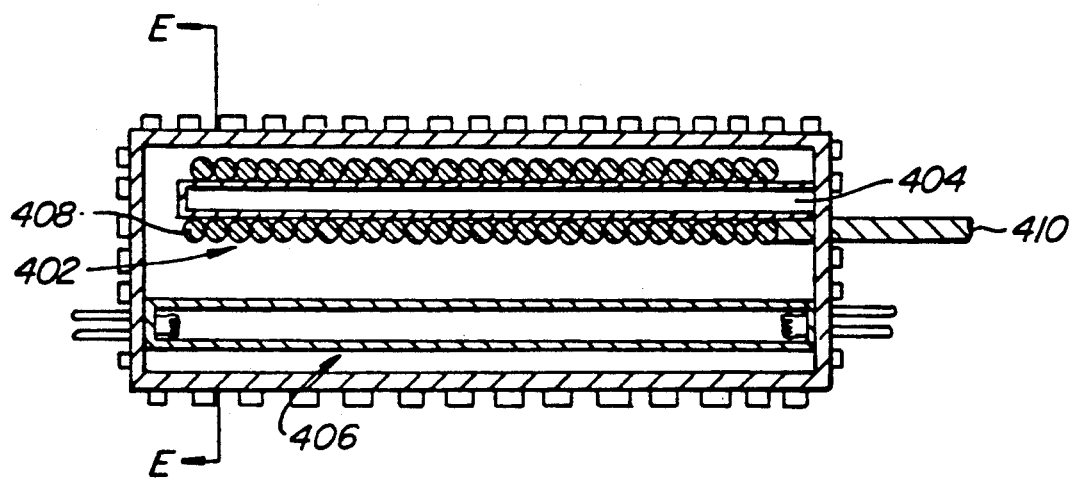
FIG. 12 is a cross-sectional view of a second version of the fiber optic lamp with the fiber wound around a supporting cylinder taken along a plane in which the longitudinal axis of the lamp lies.
Figure 13:
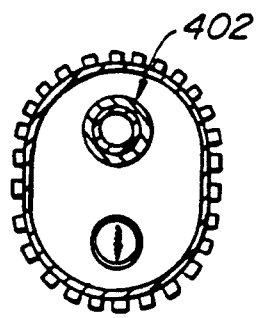
FIG. 13 is a cross-sectional view of a second version of the fiber optic lamp with the fiber wound around a supporting cylinder taken along the line E—E in FIG. 12.

Fiber bundle 306 in FIGS. 10 and 11 can be replaced by a single fiber similar to fiber 10 of FIG. 1. Or a fiber coil 402 as shown in FIG. 13 can be used. Fiber coil 402 is constructed by wrapping a single fiber 10 around a supporting cylinder 404 as shown in FIG. 12. More than one fiber may be wrapped around supporting cylinder 404. The material of supporting cylinder 404 is selected to be transparent to the radiation spectrum generated by the electric discharge tube 406. A reflective coating is applied to the end 408 of fiber coil 402 to direct propagation of optical power to the other end of the fiber coil 410.

Figure 15:
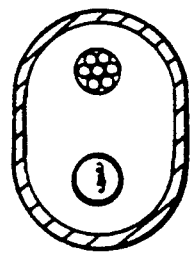
FIG. 15 is a cross-sectional view of a third version of the fiber optic lamp taken along line F—F of FIG. 14.
Figure 14:
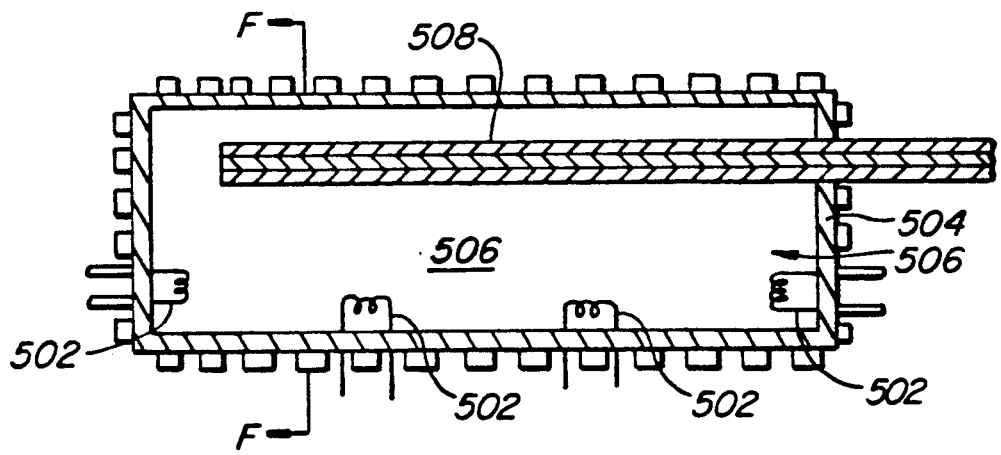
FIG. 14 is a cross-sectional view of a third version of the fiber optic lamp taken along a plane in which the longitudinal axis of the lamp lies.

In a third version of the fiber optic lamp shown in FIGS. 14 and 15 the housing functions as the discharge tube. That is the discharge tube has been eliminated and electrodes 502 are mounted onto the housing wall 504 and are not separated from the cavity 506 inside and defined by the housing wall 504. Optical fiber 508 can be a single fiber, fiber bundle, or fiber coil on supporting cylinder as described above. Cavity 506 is sealed and filled with a gas and/or a vapor which can be made to radiate when electrical energy is applied to electrodes 502. There can be a plurality of electrodes placed about the inside of housing 504.

Figure 16:
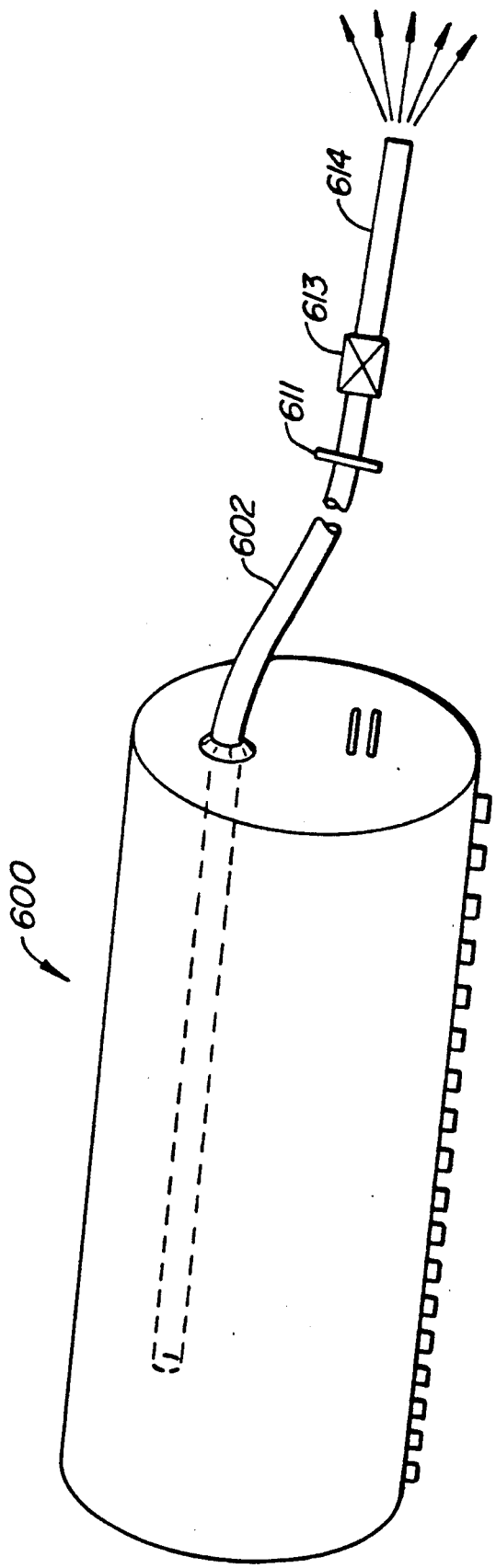
FIG. 16 is a perspective view of a fiber optic lamp to illustrate the invention.

FIG. 16 is a perspective view of the fiber optic lamp. Body 600 can be any of the type shown in 5, 6 or 8-15. The fiber can be a single fiber, fiber bundle or fiber ring. The fiber protrudes from body 600 to form a fiber pigtail 602. A fiber or fiber bundle 614 with desirable transmission characteristics can be aligned with fiber pigtail 602 by a fiberoptic connector 613. An optical filter 611 can be inserted in the fiber line to select a desired narrow band spectrum.

Further embodiments not discussed above are within the scope of the invention. For instance, it is not necessary for the optical fibers to have one end within the housing. The housing could enclose a middle portion of the optical fiber or fibers or fiber bundle so that both ends of the fibers are protruding from the housing for transmitting light at both ends. Thus the description of the preferred embodiment of this invention is given for purposes of explaining the principles thereof. It is not to be considered as limiting or restricting the invention, since many modifications may be made by the exercise of skill in the art without departing from the scope of the invention.

I claim:

1. An apparatus for producing optical power in an optical fiber, comprising:

one or more optical fibers of a type suitable for transmitting optical power, said optical fibers including an emitting material which emits optical power when excited such that the optical power given off by said emitting material will be transmitted by said optical fiber;

an exciting means for exciting said emitting material into emission of optical power, said emitting material and said exciting means being such that the optical power is emitted in a non-lasing mode, and wherein said exciting means produces an electric field and where said emitting material is responsive to said electric field to emit optical energy;

a holding means wherein said optical fibers and said exciting means are held such that the effect of the exciting means is to excite said emitting material into emission of optical power which is transmitted by said optical fibers.

2. The apparatus of claim 1, where said emitting material is an electroluminescent material.

3. An apparatus for producing optical power in an optical fiber, comprising:

one or more optical fibers of a type suitable for transmitting optical power, where said optical fiber comprises a central core, an outer cladding and an interface layer between said core and said cladding, said optical fibers including an emitting material which emits optical power when excited such that the optical power given off by said emitting material will be transmitted by said optical fiber, where said emitting material exists within or upon said core or said cladding and said interface layer comprises said emitting material;

an exciting means for exciting said emitting material into emission of optical power, said emitting material and said exciting means being such that the optical power is emitted in a non-lasing mode, where said exciting means is an irradiating means responsive to electrical energy and producing a radiation for exciting said emitting material into emission of optical power;

a holding means, wherein said optical fibers and said exciting means are held such that the effect of the exciting means is to excite said emitting material into emission of optical power which is transmitted by said optical fibers and wherein said holding means is a housing defining therein a cavity.

4. The apparatus of claim 4, where said emitting material is a luminescent material.

5. The apparatus of claim 4, where said luminescent material is phosphor, alkaline-activated phosphors, tungstate, alkaline-activated tungstate, zinc silicate, cadmium borate or rare earth oxide.

6. The apparatus of claim 4, where said irradiating means comprises one or more electric filaments or electric discharge electrodes.

7. The apparatus of claim 6, where said electric discharge electrodes are contained within a sealed discharge container defining therein a chamber for housing said electrodes, said chamber being filled with a gas or vapor of a type which can be made to radiate when electrical energy is applied across said electrodes, said tube being transparent to said radiation.

8. The apparatus of claim 7, where a metal exists within said chamber in solid, liquid or gaseous form, where said metal, if existing within said chamber in solid or liquid form, is caused to vaporize to a gaseous form upon said application of electrical energy to said electrodes, where said metal gas or vapor serves to improve the efficiency of said radiation process by providing a means for increasing conductivity between said electrodes.

9. The apparatus of claim 8, where said radiation process comprises said metal gas or vapor as the primary said gas or vapor of a type which can be made to radiate when electrical energy is applied across said electrodes.

10. The apparatus of claim 6, where said gas is halogen, rare gases or deuterium, or a vapor such as mercury, sodium or metal halide.

11. The apparatus of claim 4, where said exciting means comprises electric discharge electrodes, said electrodes being provided with a means for connection to an electrical source outside of said housing, said housing containing gas or vapor of a type which can be made to radiate when electrical energy is applied across said electrodes.

12. An apparatus for producing optical power in an optical fiber, comprising:
- one or more optical fibers of a type suitable for transmitting optical power, said optical fibers including an emitting material which emits optical power when excited such that the optical power given off by said emitting material will be transmitted by said optical fiber;
- an exciting means for exciting said emitting material into emission of optical power, said emitting material and said exciting means being such that the optical power is emitted in a non-lasing mode, where said exciting means is an irradiating means responsive to electrical energy and producing a radiation for exciting said emitting material into emission of optical power;
- a holding means consisting of a housing defining therein a cavity, wherein said optical fibers and said exciting means are held such that the effect of the exciting means is to excite said emitting material into emission of optical power which is transmitted by said optical fibers, where said housing is further provided with heat dissipating means compressed of heat-conductive elements on the outside of said housing to allow for heat dissipation into the surrounding environment.

13. The apparatus of claim 12, where said optical fiber comprises a central core and an outer cladding, where said emitting material exists within or upon said core or said cladding such that optical power given off by said emitting material will be transmitted by said optical fiber.

14. The apparatus of claim 13, where said emitting material is doped uniformly throughout the core.

15. The apparatus of claim 13, where said emitting material is doped uniformly throughout the cladding.

16. The apparatus of claim 12, where said optical fiber is comprised of a central core and outer cladding, where said emitting material exists within or upon said core or said cladding such that optical power given off by said emitting material will be transmitted by said optical fiber, where said core or said cladding or both consist entirely of said emitting material.

17. An apparatus for producing optical power in an optical fiber, comprising:
- one or more optical fibers of a type suitable for transmitting optical power, said optical fibers including an emitting material which emits optical power when excited such that the optical power given off by said emitting material will be transmitted by said optical fiber;
- an exciting means for exciting said emitting material into emission of optical power, said emitting material and said exciting means being such that the optical power is emitted in a non-lasing mode, where said exciting means is an irradiating means responsive to electrical energy and producing a radiation for exciting said emitting material into emission of optical power;
- a holding means, wherein said optical fibers and said exciting means are held such that the effect of the exciting means is to excite said emitting material into emission of optical power which is transmitted by said optical fibers, and wherein said holding means is a housing defining therein a cavity, where said housing is further provided with a cooling material existing within said cavity which provides increased heat conductivity throughout the volume of said cavity, said cooling material being transparent to said radiation.

18. The apparatus of claim 17, where said cooling material is a liquid or gas, where a forced convection means provides greater cooling effect by circulating said liquid or gas, said housing further comprised of inlet and outlet means to allow a flow of cooling liquid or gas to transfer heat from the inside of said housing to the outside environment.

19. An apparatus for producing optical power in an optical fiber, comprising:
- one or more optical fibers of a type suitable for transmitting optical power, said optical fibers including an emitting material which emits optical power when excited such that the optical power given off by said emitting material will be transmitted by said optical fiber;
- an exciting means for exciting said emitting material into emission of optical power, said emitting material and said exciting means being such that the optical power is emitted in a non-lasing mode, where said exciting means is an irradiating means responsive to electrical energy and producing a radiation for exciting said emitting material into emission of optical power;
- a holding means, wherein said optical fibers and said exciting means are held such that the effect of the exciting means is to excite said emitting material into emission of optical power which is transmitted by said optical fibers, and where said holding means is a housing defining therein a cavity, and where the end of said fiber or fibers within said housing is reflective with respect to said optical energy.

20. An apparatus for producing optical power in an optical fiber, comprising:
- one or more optical fibers of a type suitable for transmitting optical power, said optical fibers including an emitting material which emits optical power when excited such that the optical power given off by said emitting material will be transmitted by said optical fiber;
- an exciting means for exciting said emitting material into emission of optical power, said emitting material and said exciting means being such that the optical power is emitted in a non-lasing mode, where said exciting means is an irradiating means responsive to electrical energy and producing a radiation for exciting said emitting material into emission of optical power and where said irradiating means comprises one or more electric filaments or electric discharge electrodes in a discharge container which is cylindrical with said electrodes at each end;
- a holding means, wherein said optical fibers and said exciting means are held such that the effect of the exciting means is to excite said emitting material into emission of optical power which is transmitted by said optical fibers, where said holding means is a housing defining therein a cavity, and where said housing is provided with a reflective means on the inner wall of said housing, or where said housing is transparent to said radiation and is provided with a reflective means on the outer wall of said housing, said reflective means serving to reflect said radiation.

21. The apparatus of claim 20, where said housing means is cylindrical, where said discharge container is concentric within said cavity and spans the length of said cavity, said electrodes having protruding means through said tube and said apparatus for connecting said electrodes to an electrical source outside of said housing.

22. The apparatus of claim 21, where said optical fibers are positioned between said housing and said discharge container such that the longitudinal axes of the fibers are parallel with the longitudinal axis of said housing and such that the fibers protrude out of said housing, said positioning serving to increase the surface area of said emitting material able to be impinged by said radiation.

23. The apparatus of claim 22, where said positioning further comprises additional layers of said optical fibers, said layers comprising optical fibers placed next to said optical fibers already positioned between said housing and said discharge container.

24. The apparatus of claim 21, where said optical fibers comprise a single fiber wound around said discharge container and protruding from said housing, said winding serving to increase the surface area of said emitting material able to be impinged by said radiation.

25. The apparatus of claim 20, where said housing means is an elliptical cylinder, where said discharge container is positioned at one of the foci of the ellipse defined by a cross section of said elliptical cylinder, said optical fiber being positioned at the other focus, where the longitudinal axes of said optical fiber and said discharge container are parallel with the longitudinal axis of said housing, such that radiation from said discharge container which does not directly impinge said optical fiber is reflected from said inner wall or outer wall of said housing to impinge said optical fiber.

26. The apparatus of claim 25, where said optical fiber comprises a bundle of two or more optical fibers protruding out of said housing.

27. The apparatus of claim 25, where said apparatus further comprises a supporting rod attached to said housing, where said optical fiber is a single fiber wound around said supporting rod, said optical fiber protruding from said housing.

* * * * *

UNITED STATES PATENT AND TRADEMARK OFFICE
CERTIFICATE OF CORRECTION

PATENT NO. : 5,109,463
DATED : April 28, 1992
INVENTOR(S) : Ho Shang Lee

It is certified that error appears in the above-identified patent and that said Letters Patent is hereby corrected as shown below:

Column 8, line 41, in Claim 4     replace "claim 4" with ---claim 3---

Column 8, line 47, in Claim 6     replace "claim 4" with ---claim 3---

Column 9, line 35-36, claim 12    replace "compressed" with ---comprised---

Signed and Sealed this

Tenth Day of August, 1993

Attest:

MICHAEL K. KIRK

Attesting Officer    Acting Commissioner of Patents and Trademarks